Nov. 5, 1963 C. W. BARBOUR, JR., ETAL 3,110,026
RADAR TARGET SIMULATOR
Filed May 24, 1956 2 Sheets-Sheet 1
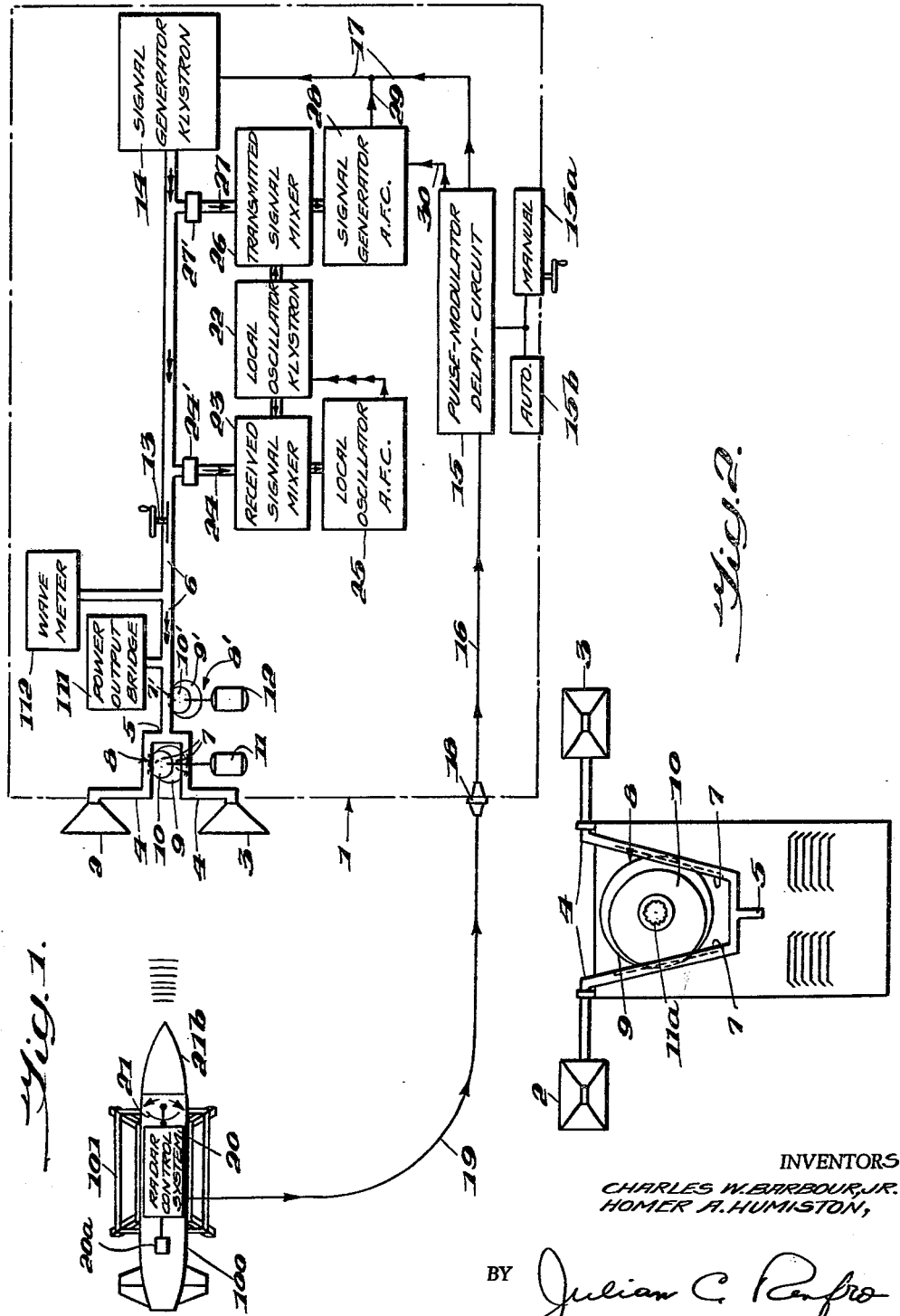
INVENTORS
CHARLES W. BARBOUR, JR.
HOMER A. HUMISTON,
BY *Julian C. Renfro*
ATTORNEY

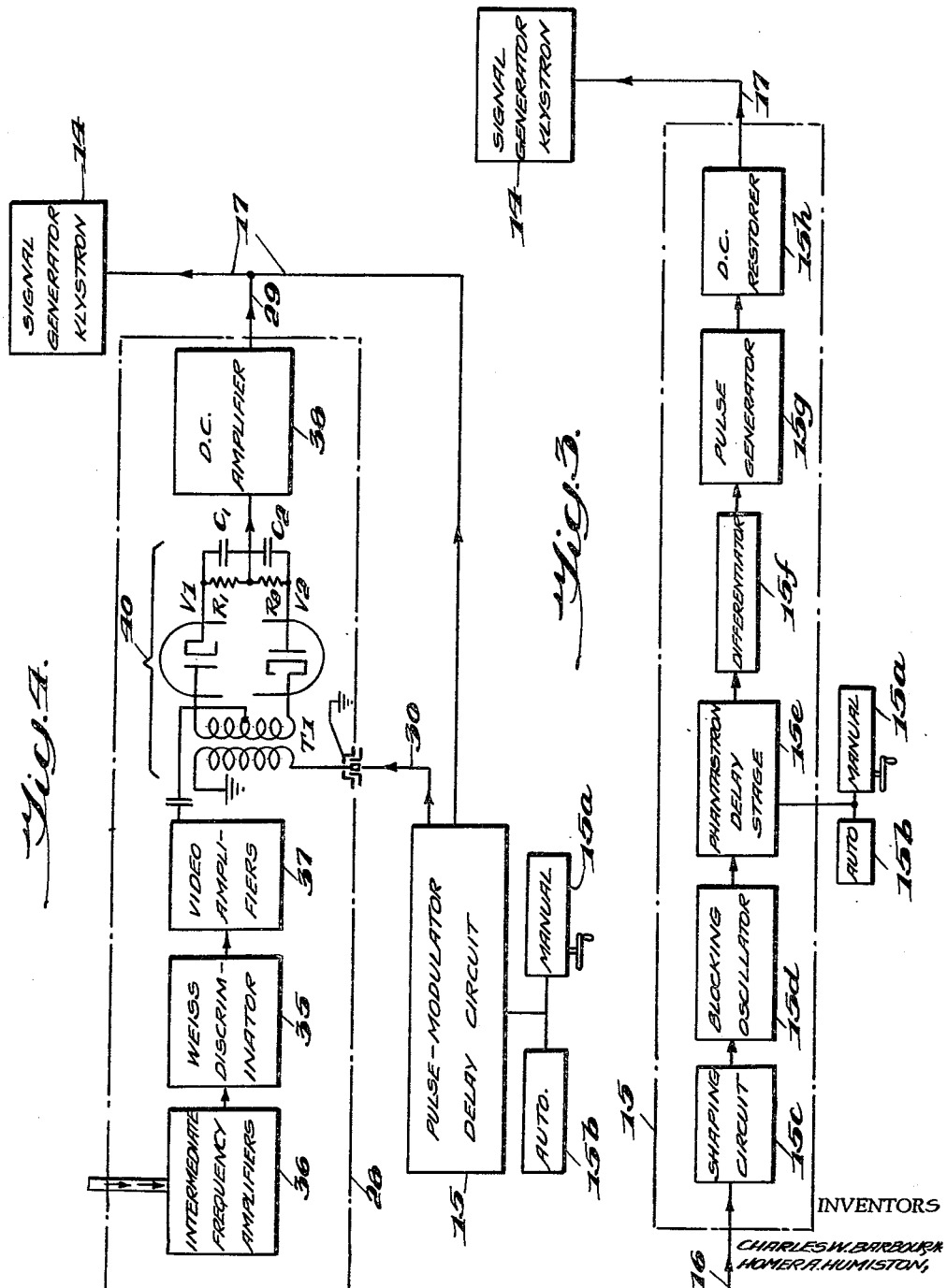

United States Patent Office 3,110,026
Patented Nov. 5, 1963

3,110,026
RADAR TARGET SIMULATOR
Charles W. Barbour, Jr., and Homer A. Humiston, Baltimore, Md., assignors to Martin-Marietta Corporation, a corporation of Maryland
Filed May 24, 1956, Ser. No. 587,158
8 Claims. (Cl. 343—17.7)

This invention relates to test equipment for radar control systems, particularly for such systems as used in guided missiles.

In certain military operations, the destruction of enemy aircraft is sought to be accomplished by using explosive missiles capable of following and overtaking such airborne targets. Often, evasive tacts employed by the enemy aircraft require pursuit over a rapidly changing course. This ability to track the target aircraft over a tortuous flight path is known as homing, and is accomplished by a complete radar control system contained within the missile. This radar control system may include both transmitting and receiving facilities as well as suitable linkages to properly actuate the control surfaces of the missile.

In operation, pulses of high frequency radiation are periodically emitted from the transmitting antenna of the missile. These pulses are reflected by the target and received by the missile as a target echo. To insure that the missile flies a collision path, any evasive action by the target aircraft must be countered by a compensating change in the course of the missile. In order to accomplish the requisite change in course, the elevation, bearing and range information implicit in the received target echo must initiate correctional movements of the control surfaces of the guided missile. In other words, the movement of the airfoils is directly dependent upon and is controlled by the character of the reflected target echoes.

Several practical methods exist for achieving such interdependence between the received target echo and the airfoils of the missile as will enable the missile to home on the chosen target. For example, the use of a phase comparison radar to analyze the incoming signal, with a hydraulic airfoil actuator, stabilized by signals from precessible displacement gyroscopes, has been suggested. The flight path is aligned with the gyroscopes, whose rates of precession are proportional to the radar signals. However, the specific means employed within the missile to receive and utilize the radar signal for actuating the missile control surfaces forms no part of the present invention, and the detailed description thereof is deemed unnecessary.

The inventive concept herein disclosed is directed to a device for use in evaluating the performance of guided missile radar control systems under conditions of actual use. It is well known that in such electromechanical and electrohydraulic control systems some finite time lag must always occur between detection of error and the correction thereof. Often, the individual friction and inertia losses are cumulative and cause an over-all system lag which substantially increases the system response time. Further, even after realignment of the system to the new condition, errors caused by minute inaccuracies in mechanical or electrical components may still cause the system to function imperfectly. Because of the inherent inability of these systems to respond instantaneously to changed conditions, or to attain the new steady state with theoretical exactitude, it is often essential to conduct a series of tests to secure performance data.

In radar control systems for guided missiles especially, where extremely minute errors may result in total failure to intercept the target aircraft, the necessity for adequate testing methods and apparatus is obvious. The capability of the missile to properly realign its airfoils in response to information implicit in the reflected target echo must be ascertained, for comparison with known standards of performance. Of equal importance, also, is the necessity for testing completely new systems, or the response of known systems with new components incorporated therein.

Since the homing system of any guided missile must respond accurately in a variety of circumstances, it will be evident that performance data secured under realistic target conditions will be of the utmost value. The control system must exhibit an excellent response at any compass bearing or range within the kill-orbit of the missile. Also, the time rate at which the range or bearing changes must not exceed the ability of the missile to rapidly adopt the corresponding new collision path.

In addition to the above variations, all of which are effected by the target aircraft, the reflected target echo may manifest the usual fading effect associated with reception of almost all radio frequencies. Also, substantial fluctuations may occur in the ratio of the received target echo signal strength to that of the noise signal.

In view of the variety of conditions caused by the evasive action of the target aircraft, and the usual anomalous atmospheric fluctuations in the received strength of the target echoes it will be apparent that for utmost reliability performance data on the system response of the missile should be recorded under the same, or closely similar, conditions. As an aid in securing such reliable data, this invention contemplates an artificial target adapted to substantially duplicate the actual conditions under which a guided missile radar control system must function.

Accordingly, therefore, a primary object of this invention is to provide an artificial target adapted to simulate varying values of range and bearing.

A second object of this invention is to provide an artificial target adapted to simulate a varying time rate of change of either range or bearing.

Another object of this invention is to provide an artificial radar target adapted to simulate the effect of fading or fluctuating signal to noise ratio.

Another object of this invention is to provide a device which may appear to a radar controlled missile as a target of simultaneously changing range and bearing, which is reflecting a target echo of both fluctuating signal to noise ratio and signal strength.

A further object of the invention is to provide a device for use in securing performance data on the over-all response of a tracking radar, including its servomechanism control system.

A still further object of the invention is to provide an artificial target adapted for use in obtaining both static and dynamic performance data on the angle tracking characteristics of a guided missile radar control system.

A still further object of the invention is to provide a target simulator suitable for use in obtaining the static and dynamic characteristics of the automatic gain control of a guided missile radar control system.

A still further object of this invention is to provide a device for use in evaluating the dynamic characteristics of the automatic range tracking unit of a guided missile radar control system, with varying range rates and varying signal to noise ratios.

Further and other objects will become apparent from the description of the accompanying drawings, which forms a part of the disclosure and in which like numerals refer to like parts.

FIGURE 1 is a schematic drawing of the invention, which shows in block diagram form the circuitry and connections.

FIGURE 2 is a front view of the invention, showing a modulator wheel with its associated output wave guides and horn radiators.

FIGURE 3 is a block diagram of the variable delay circuit utilized in the invention.

FIGURE 4 is a diagram of the components which comprise the signal generator automatic frequency control.

Referring more particularly now to FIGURE 1, the drawing discloses a target simulator generally indicated by the numeral 1. The simulator 1 is provided with a pair of spaced horn radiators 2 and 3. These radiators are identical and are connected by a substantially U-shaped waveguide 4, provided with a medially located junction 5. The junction 5 is coupled to the central waveguide 6 and is adapted to receive energy therefrom.

The inner wall surface of each leg of the U-shaped waveguide 4 is provided with a slot 7. A modulator wheel, indicated generally at 8, which extends through the slot 7 and rotates therein, comprises a variable speed disk attenuator. The modulator wheel 8 includes two superposed disks 9 and 10, which may be seen most clearly in FIGURE 2. Disk 9 is composed of an electrically nonconducting material, and always rotates with its periphery within the slots 7 in both arms of the U-shaped waveguide 4. Disk 9, being a non conductor, can exert no influence on the electromagnetic energy traveling within the waveguide.

The disk 10 is metallic and may be adjusted to rotate with any degree of eccentricity with respect to disk 9. A threaded knob 11a, or other suitable means, may be employed to secure both disks together after disk 10 has been adjusted to the desired eccentricity. This adjustment controls the maximum depth to which the metallic disk 10 may penetrate the waveguide during each revolution. As will be well understood by those skilled in the art, the farther that any such moving resistive partition extends into the waveguide the more attenuation is obtained because of the decrease in field intensity, which is caused by conduction in the metallic material.

The modulator wheel 8 is adapted to be driven by a variable speed motor 11. The motor 11 may comprise a conventional electric motor of the type adapted to deliver torque over a wide range of readily controlled speeds, and the structure thereof forms no part of this invention.

Shown generally by the numeral 8' is a second modulator wheel, comprising disks 9' and 10', and forming a variable speed disk attenuator. Disk 9' revolves concentrically with the shaft of motor 12, and disk 10' may be adjusted to revolve eccentrically with respect to disk 9' and the motor shaft. The eccentricity of disk 10' with respect to disk 9' and the motor shaft is variable and may be maintained at any desired setting by a clamping knob or other suitable means. The disks 9' and 10' are adapted to penetrate a longitudinal slot 7' which is provided in the central waveguide 6. The disk 9' is composed of an electrical insulating material, and the disk 10' is composed of an electrically conductive metallic material.

It is contemplated that the method and structure used to modulate energy traversing the central waveguide 6 will closely resemble the method and structure employed in modulating the output energy from the U-shaped waveguide 4. In both cases the longitudinally slotted waveguide is penetrated by a rotating conductive disk of controlled speed and eccentricity. The depth of penetration in the slot controls the degree by which the output power varies, and the motor speed controls the time rate at which the cyclic variations in output power occur.

The central waveguide 6 is coupled to a power output bridge 111. The bridge 111 may comprise a conventional wheatstone bridge circuit provided with a very sensitive galvanometer nulldetector, and utlizing as an unknown resistance a thermistor element exposed to radiant energy within the waveguide. With the bridge once balanced, any change in the output power level effects a corresponding change in the resistance of the thermistor element; this causes a corresponding electrical unbalance in the bridge circuit with consequent galvanometer deflection.

Wave meter 112 is of the absorption type and is conventional in design and application, as is the power output bridge 111. The specific structure of the bridge 111 and the wave meter 12 as herein disclosed is merely illustrative and the successful practice of the invention may also be accomplished by using other suitable means to meter the output power and frequency.

Out-put-attenuator 13 is adapted to intercept radiant energy traversing the central waveguide 6, and is manually adjustable by means of a calibrated knob. The attenuator 13 may comprise an insulated strip of resistance material placed longitudinally in waveguide 6 and laterally adjustable with respect thereto, for accurately controlling the level of the output power. Output attenuaor 13 differs from the modulator wheel 8' in that the latter is adapted to effect a cyclic variation in the output power level, by means of motor 12, while attenuator 13 is manually actuated and fixes the level of maximum output power. In other words, the modulator wheel 8' can modulate only that quantum of radiant energy which the attenuator 13 permits the waveguide 6 to convey.

The numeral 14 denotes a signal generator klystron which is coupled to a central waveguide 6 and adapted to deliver energy thereto. Since the output frequencies in the preferred embodiment of the simulator occur within the X band, which is defined for purposes of this specification as the frequency range between 5200 and 11,000 megacycles approximately, a reflex klystron is used as an oscillator. This reflex klystron oscillator is of standard construction, and is a species of velocity modulated vacuum tube which is particularly suitable for high frequency operation. By adjusting the negative voltage applied to the repeller electrode of the klystron, it is possible to vary the frequency of oscillations slightly; this affords a means of automatic frequency control, as is developed more fully below.

It will be appreciated that the signal generator klystron 14 does not oscillate continuously, but is normally cutoff and will deliver discrete bursts of radiant energy only when pulsed.

Referring now more particularly to FIGURE 3, the numeral 15 indicates generally a pulse modulator delay circuit. This circuit is adapted to receive periodic pulses of high frequency energy from conductor 16 and deliver them to signal generator klystron 14, via conductor 17. The conduction periods of signal generator klystron 14, and hence the time rate at which high frequency pulses are delivered to the central waveguide 6, is under the complete control of the pulse modulator delay circuit 15.

The incoming pulses, delivered via conductor 16, may be delayed in time by a finite interval before delivery to conductor 17. Since signal generator klystron 14 oscillates only in response to pulses delivered via conductor 17, the output pulses delivered to the spaced horn radiators 2 and 3 may be caused to lag the input pulses to conductor 16 by some preset interval. The amount of time delay is variable and may be set at various values by means of manual control 15a or changed continuously with automatic control 15b, as will be presently explained. More particularly, the variable delay circuit 15 may comprise a suitable shaping circuit 15c for properly shaping the input pulse to trigger a conventional blocking oscillator 15d. The output of the blocking oscillator is fed to a phantastron delay stage 15e which is adapted to deliver an output pulse after a finite controlled interval. The use of phantastron action to control the delay time has been found to be particularly satisfactory, and the circuit operation is well understood by those skilled in the art. A detailed description of phantastron action may be found in "Waveforms," Chance et al., at Section 5.15 et seq., Vol. 19, M.I.T. Radiation Series, McGraw-Hill, 1948.

For purposes of this specification, it is sufficient to state that the phantastron delay stage includes a pentode tube such as a 6AS6, characterized by the appearance of a unidirectional flat topped pulse at the screen grid, when a negative trigger is injected at the control grid. The duration of the flat topped pulse is directly controlled by the magnitude of the positive voltage applied to the anode. Smooth control of the anode voltage may be accomplished by mechanical movement of the center tap of a potentiometer connected in series with the voltage supply, or by any of a variety of equally suitable methods. The position of the potentiometer center tap may be altered with the manual control 15a or changed continuously with automatic control 15b, and it will be appreciated that other methods of changing the anode voltage are equally amenable to either manual or automatic control.

The output pulse appearing at the pentode screen grid is applied to a conventional RC differentiator circuit 15f to secure a pair of voltage peaks which coincide respectively with the leading and trailing edge of the said pulse. The separation between the voltage peaks represents the time delay afforded by phantastron action, and corresponds to the length of the screen grid pulse, which is directly dependent upon plate potential, as above stated, and may be readily controlled by either manual control 15a or automatic control 15b. The delayed trigger thus obtained is fed to a pulse generator 15g. The pulse generator 15g shapes the delayed trigger wave form suitably for application as a gate voltage to the repeller electrode of the signal generator klystron, to control the oscillatory period thereof. This gate voltage is always simultaneously applied to the signal generator automatic frequency control, as will be explained later in the description of that section.

Since the signal generator klystron frequency is somewhat voltage responsive, the magnitude of the periodic voltage pulses which control the oscillatory interval must remain constant. This is accomplished by feeding the gate voltage to the klystron repeller through a conventional diode clamping circuit or D.C. restorer 15h, as it is sometimes referred to.

In summary, therefore, the pulse modulator delay circuit 15 comprises a shaping circuit, a blocking oscillator, a phantastron delay stage, a differentiator, and a pulse generator adapted to deliver a substantially constant gate impulse through a D.C. restorer.

Referring again to FIGURE 1, the input pulses which are fed to delay circuit 15 via conductor 16 are delivered thereto from the radar control system 20, over conductor 19. Conductor 19 in the preferred embodiment comprises a coaxial cable which connects the radar control system 20 to conductor 16 by a suitable coupling-member 18. Radar control system 20 is provided with antenna 21 adapted to both transmit and receive high frequency energy through radome 21b and to align itself in the direction of strongest received signal strength. Radome 21b is composed of a material which is substantially transparent to radar signals. System 20 diagrammatically depicts a radar control system adapted to feed servomechanism 20a which realigns or reorients the airfoils of guided missile 100, in response to information implicit in the reflected target echo. It will be appreciated that the radar transmitter of the missile emits periodic pulses of high frequency energy, followed by listening periods, and that a pulse is dispatched to the target simulator 1 over conductor 19, simultaneously with each such transmitter pulse. During the transmitter pulses, the antenna 21 is effectively blocked to eliminate uncontrolled target echoes and insure that target echoes are returned only by the simulator after predetermined time delays.

Because of the narrow frequency band over which most missile radar control systems operate, it is absolutely essential that the output frequency of the target simulator be stabilized at the proper value. During the listening period between transmitter pulses, the target echo detected by control system 20 must occur at the same frequency at which it was transmitted. This is accomplished by a double automatic frequency control.

Local oscillator 22 comprises a conventional reflex klystron which may be tuned 30 megacycles above the transmitter frequency of the guided missile radar control system. It will be appreciated that 30 megacycles has been chosen only as an illustrative value, and that some other frequency could serve equally well in practicing the invention. The output of local oscillator 22 is fed to received signal mixer 23. Radiant energy from control system 20 which has been intercepted by the horn radiators 2 and 3 and transmitted therefrom to the central waveguide 6 is sampled by means of a directional coupler 24′ in lateral waveguide 24 and fed to the received signal mixer 23.

In the said mixer 23, which may comprise a conventional type of balanced crystal mixer, the frequencies of the received signal and local oscillator are heterodyned to derive the 30 megacycle intermediate frequency, which is fed to the local oscillator automatic frequency control 25.

The local oscillator automatic frequency control 25 comprises two stages of pentode intermediate amplification and a Weiss discriminator circuit. The discriminator develops the conventional direct current output which varies linearly with input frequency, and is either more or less negative according to the sense of the deviation of the amplified intermediate frequency input. The D.C. output of the discriminator is constant only when exactly the correct intermediate frequency is present; minute frequency drifts manifest themselves instantly as changes in the output D.C. signal. The discriminator output D.C. is applied through a potentiometer to the control grid of a high gain triode, which serves as a D.C. amplifier.

The output of the D.C. amplifier is applied to the repeller electrode of the local oscillator reflex klystron. Since the output frequency of any reflex klystron may be varied over a slight range by changing the repeller potential, it will now be apparent that whenever the local oscillator drifts off-frequency, the intermediate frequency output from the receiver signal mixer 23 will correspondingly drift and the minute frequency deviations thus derived will effect a change in the D.C. level of the discriminator output which can be fed back to the klystron's repeller electrode to correct the local oscillator frequency.

The units 22, 23 and 25 comprise the first system for automatic frequency control in the double automatic frequency control above referred to, and involve locking the local oscillator frequency at the desired value. In the local oscillator automatic frequency control the pentode intermediate frequency amplifiers are conventional, as is the high gain triode D.C. amplifier; the Weiss discriminator circuit is thoroughly explained in the text "Microwave Mixers," by R. V. Pound, published by McGraw-Hill, New York, 1948, and comprising volume 16 of the MIT Radiation Laboratory Series.

In the second of the two systems which comprise the double automatic frequency control, the local oscillator 22 delivers to transmitted signal mixer 26 the frequency which has been locked in at 30 megacycles above the frequency of the radar control system transmitter. The mixer 26 is also permitted to sample the output frequency of the signal generator klystron 14, by means of directional coupler 27′ in lateral waveguide 27, which joins the central wave guide 6 and diverts a portion of the energy therefrom to said mixer. Within the mixer 26, which may comprise a conventional type of balanced crystal mixer, the frequencies of the transmitted signal and local oscillator are heterodyned to derive the nominal 30 megacycle intermediate frequency which is then fed to the signal generator automatic frequency control 28.

The automatic frequency control 28 basically is a frequency-sensitive circuit which provides a D.C. output voltage to be fed back to the repeller electrode of the signal generator klystron via conductors 29 and 17. The intermediate frequency output of mixer 26 will mirror variations in only the output frequency of the signal generator 14, since the local oscillator frequency is locked on-frequency by the local oscillator automatic frequency control 28. Thus, if the signal generator klystron drifts off-frequency, the intermediate frequency output from the transmitted signal mixer 26 will correspondingly drift; the minute frequency deviations thus derived will effect a change in the D.C. output of the signal generator automatic frequency control 28 which can be fed back to the signal generator klystron's repeller electrode to restore oscillation at the proper frequency.

Referring now more particularly to FIGURE 4, the signal generator automatic frequency control 28, in the preferred embodiment, includes the Weiss discriminator 35 preceded by pentode intermediate frequency amplifiers 36, and followed by two video amplifiers 37. The output of the video amplifiers 37 is fed to a pulse stretcher 40, which supplies the grids of the high gain double triode D.C. amplifier. The signal generator automatic frequency control components are completely conventional, except for the pulse stretcher 40. The pulse stretcher 40 comprises an electronic switch, which connects the input to the output only for the duration of the gate pulse which is delivered via conductor 30.

When the pulse modulator delay circuit 15 pulses the signal generator klystron 14, a gate pulse is simultaneously applied to pulse stretcher 40, via conductor 30. This gate pulse is applied to the primary winding of transformer T1, and excites the secondary thereof. The two back-to-back diodes V1 and V2 are connected to the oppositely poled extremes of the center tapped secondary winding of T1. The input signal from the video amplifiers 37 is capacitor coupled to the center tap on the secondary of T1; output voltage is coupled to the D.C. amplifier 38 from the common juncture of R1, C1 and R2, C2; the D.C. amplifier 38 supplies to signal generator klystron 14 a correctional signal, via conductors 17 and 29, as previously explained.

To summarize briefly thus far, the double automatic frequency control includes two interlocking systems; in the first, the local oscillator is locked in at 30 megacycles above the frequency of the radar transmitter of control system 20 under test—in the second, the signal generator output frequency is locked in at 30 megacycles below the frequency of the local oscillator. Thus, the simulated target echoes returnable by the target simulator are doubly locked in and any oscillator drift is substantially eliminated.

Turning now to the complete theory of operation of the target simulator, the radar control system 20 to be tested is positioned on support cradle 101, or other suitable means, at a known distance from the simulator, on a line which bisects the two horn radiators 2 and 3. The radar transmitter of the guided missile is turned on, and adjusted to produce the periodic pulses, followed by listening periods, which characterize the homing flight of the missile. Antenna 21 is suitably isolated from the radar transmitter and conductor 19 is connected between system 20 and the simulator 1.

The static response of the test system at various values of range is readily secured by adjusting the pulse modulator delay circuit 15 to furnish the proper delay. The simulated target echo returned by signal generator klystron 14 to the radar receiver in radar control system 20 can be delayed any chosen time interval by properly setting the manual control 15a. The signal thus radiated may be used to "boresight" the radar antenna system, and bring the electrical axis thereof into perfect coincidence with the missile-axis. Further, the dynamic response of the test system 20 while rapidly overtaking the target, or while being outdistanced, can be easily obtained by changing the time delay at the same time rate at which the target echoes would return to the radar receiver in the actual pursuit. This adjustment for varying range rates may be made with the manual control 15a, or with the automatic control 15b, and the performance of the automatic range tracking unit, a circuit within the missile designed to track a moving target, may be thus secured by changing the time delay to simulate the flight of the target.

The angle tracking ability of the radar control system 20 may also be tested. The modulator wheel 8 may be adjusted to completely cut off the output of one horn radiator during the instant of maximum output of the other horn. This effectively modulates the output power from both horns at 180° out of phase. To the radar receiver, the target echo of maximum signal strength appears to cyclically return from a new direction, and necessitate realignment of the missile's airfoils. By means of the variable speed motor 11, which controls the speed at which the modulator wheel 8 rotates in slot 7, the time rate at which the apparent target moves may be controlled. Also, by changing the eccentricity of disk 10 with respect to disk 9, and thus effectively changing the percentage modulation produced by modulator wheel 8, the excursion, or displacement of the artificial target from either side of the center line will appear different to phase comparison radar. Thus, dynamic measurements of the effect of bearing rate on the system response may be obtained.

For known values of range and bearing, and the rate of change thereof, either the actual deflection of the missile's airfoils or the position of the antenna may be recorded. Because of the fact that the antenna direction always leads the velocity-axis by a known angle, its position is equally significant to that of the airfoils. The simultaneous recording of the target simulator variables, along with the resulting deflections of the airfoils or antenna, offers a convenient means of evaluation.

By means of modulator wheel 8' the effect of atmospheric attenuation of the radar signals may be simulated. The cyclic fading, or undulations in signal strength which occurs in actual operation may be simulated by varying the maximum level of outgoing energy in central waveguide 6. As previously explained, the modulator wheel 8' comprises a variable speed disk attenuator position in waveguide 6, and rotated therein by motor 12 at any desired speed. Hence, the ability of the missile to adopt a collision path despite conditions of atmospheric fluctuation in the signal strength may be investigated, and the performance of the automatic gain control of the radar control system 20 may be readily observed.

Output attenuator 13, which is manually adjustable, may also be used to set various levels of output energy in the waveguide 6, for the purpose of securing automatic gain control data. Of far greater utility, however, is the ability of the attenuator 13 to furnish varying signal-to-noise ratios. For a given noise figure, a range of signal strength values may be set, and performance data for the missile secured at the corresponding signal-to-noise ratios. Since the noise level limits the minimum detectable power, it will be appreciated that performance data for the missile thus secured will be invaluable. It will be appreciated that several variables may be simultaneously simulated, and that the target may be caused to assume rapidly changing values of both range and bearing, and reflect a target echo of fluctuating signal strength. Performance data taken under these conditions will best indicate the ability of the missile to function under actual use. The overall system response of the complete control servomechanism is readily obtainable, as is data on the ability of the automatic range tracking unit, and the automatic gain control under dynamic conditions with varying signal-to-noise ratios.

While the invention is illustrated as providing an artificial target for a guided missile radar control system, it should be obvious to those skilled in the art that the invention may be applied to any tracking radar system which effects a physical movement in response to information implicit in a reflected target echo.

It is to be understood that certain changes, modifications and substitutions can be made without departing from the spirit and scope of the appended claims.

We claim as our invention:

1. In a target simulator for a radar control system which radiates periodic pulses of energy followed by listening periods and effects a mechanical movement in accordance with information returned therein, variable delay means connected to said radar control system to receive and delay said periodic pulses to form later output-pulses, oscillator means connected to receive said output-pulses and generate oscillatory electrical energy only in response thereto, at least two radiating means commonly connected to receive and radiate as an output-signal said electrical energy from said oscillator means, first modulator means connected to periodically attenuate said electrical energy traveling between said oscillator means and said spaced radiating means; second modulator means connected to periodically attenuate said output-signal from said radiating means and vary the power division therebetween for providing apparent angular displacements of the simulated target with respect to said radar control system, whereby there is obtained an apparent radar target of variable range which traverses a predetermined angular sector at controlled values of speed and signal strength.

2. A target simulator for radar control systems of the type having a radar-transmitter which periodically emits radiant energy followed by quiescent intervals for detection of target echoes which comprises; a pulse modulator delay circuit connected to said control system to receive input pulses therefrom and deliver output pulses at controlled intervals thereafter; a first klystron oscillator connected to receive said output pulses and deliver an oscillatory electrical signal only for the duration thereof, at a frequency dependent on the magnitude of a first error signal; a central waveguide provided with a slot intermediate its two ends and coupled at the first of said ends to said first klystron oscillator to receive said oscillatory signal therefrom; spaced horn radiators, parallel-fed by jointly connected slotted waveguides and coupled to the other end of said central waveguide to receive energy therefrom; a first variable speed disk attenuator mounted to rotate within said slot in said central waveguide, and a second variable speed disk attenuator mounted to rotate within the slots of said jointly connected slotted waveguides; a first mixer coupled to receive from said central waveguide only the frequency of said first klystron oscillator, and a second mixer coupled to receive from said central waveguide only the frequency of said radar transmitter; a second klystron oscillator connected to supply a local oscillation to said first and second mixers at a frequency dependent on the magnitude of a second error signal; a first automatic frequency control connected to receive from said first mixer a first beat-frequency and derive and deliver to said first klystron oscillator a first error signal therefrom during only said output pulse from said pulse modulator delay circuit; and a second automatic frequency control connected to receive from said second mixer a second beat-frequency and derive and deliver to said second klystron oscillator a second error signal therefrom, whereby there is provided an artificial target of simultaneously variable range, bearing, and signal-to-noise ratio.

3. In a radar target simulator for control systems having a radar transmitter which produces periodic output-pulses of energy, followed by quiescent periods for echo detection; means to generate high-frequency energy when pulsed, and means to radiate said high-frequency energy; means to divide and deliver said energy to said radiating means, means connecting said generating means to said dividing means to convey said energy thereto, first coupling means, variable delay means connected by said first coupling means to receive said output pulses and being designed to introduce a delay thereto, and means for coupling the delayed said output pulses from the output of said variable delay means to said generating means; means to variably attenuate said energy conveyed in said connecting means, and means to variably attenuate said energy in said dividing means and vary the power division therebetween; means to locally oscillate above said radar transmitter at a first beat-frequency, and means to maintain said first beat-frequency substantially constant; means to mix the frequencies from said generating means and said local oscillator means and derive a second beat-frequency therefrom, and means to correct said generating means in accordance with deviations in said second beat-frequency, whereby effectively maintaining the frequencies of said generating means and said radar transmitter substantially identical.

4. In combination, a radar controlled guided missile of the type provided with a radar transmitter to radiate periodic pulses followed by listening periods and realign the air foils accordingly with information received therein, a pulse responsive signal generator klystron, a slotted central waveguide coupled to said signal generator klystron, a first variable speed disc attenuator mounted to protrude through and revolve within the slot in said central waveguide, a substantially U-shaped waveguide coupled to said central waveguide, and provided with slotted inner wall surfaces, a second variable speed disc attenuator mounted to penetrate said slotted inner wall surfaces and revolve therein; a pair of mixers coupled to sample, respectively received signals from said radar transmitter, and transmitted signals from said signal generator klystron, and a local oscillator coupled to feed both mixers; a first automatic frequency control to sample only the received signal mixer output and control said local oscillator in accordance therewith, and a second automatic frequency control to sample only the transmitted signal mixer output and control said signal generator in accordance therewith, and a pulse modulator delay circuit adapted to receive and relay to said signal generator klystron the periodic pulses from said transmitter at controlled intervals thereafter.

5. In a target simulator for a radar control system which radiates periodic pulses of energy followed by listening periods and effects mechanical movement in accordance with information returned therein, said simulator comprising means to receive input pulses synchronously with said radiated periodic pulses and shape trigger pulses therefrom, means to receive said trigger pulses and derive short output-impulses therefrom, means to receive said output-impulses and derive flat-topped rectangular pulses of controlled duration therefrom, means to differentiate said flat-topped pulses, means to form a succession of gate-voltage impulses from said differentiated flat-topped pulses, and means to maintain substantially constant the voltage amplitude of said successive gate-voltage impulses, oscillator means connected to receive said gate-voltage impulses from said variable delay circuit means and generate oscillatory electrical energy only in response to said gate-voltage impulses, spaced radiating means commonly connected to receive and radiate as an output-signal said electrical energy from said oscillator means, first modulator means connected to periodically attenuate said electrical energy traveling between said oscillator means and said spaced radiating means; second modulator means connected to periodically attenuate said output-signal from said spaced radiating means and vary the power division therebetween, whereby there is obtained an apparent radar target of variable range and range rate which traverses a predetermined angular sector at controlled values of speed and signal strength.

6. In a target simulator for a radar control system which radiates periodic pulses of energy followed by listening periods and effects mechanical movement in accordance with information returned therein, said target simulator comprising a shaping circuit connected to receive said pulses and form trigger pulses therefrom, a blocking oscillator to receive said trigger pulses and derive output-impulses therefrom, a phantastron delay stage including a pentode coupled to receive said output-impulses and develop at the screen grid in response thereto flat-topped pulses of duration proportional to anode-voltage magnitude, variable voltage means to control said anode-voltage magnitude, a differentiating circuit to receive said flat-topped pulses, a pulse generator coupled to receive said differentiating circuit output and develop succesive gate-voltage impulses therefrom, and a D.C. restorer to maintain constant the voltage amplitude of said successive gate-voltage impulses, oscillator means connected to receive said gate-voltage impulses from said variable delay circuit means and generate oscillatory electrical energy only in response to said gate-voltage impulses, spaced radiating means commonly connected to receive and radiate as an output-signal said electrical energy from said oscillator means, first modulator means connected to periodically attenuate said electrical energy traveling between said oscillator means and said spaced radiating means; second modulator means connected to periodically attenuate said output-signal from said spaced radiating means and vary the power division therebetween, whereby there is obtained an apparent radar target of variable range and range rate which traverses a predetermined angular sector at controlled values of speed and signal strength.

7. A target simulator for a radar control system which radiates periodic pulses of energy followed by listening periods and effects a mechanical movement in accordance with information returned therein, said simulator comprising, delay means connected to said radar control system to receive and delay said periodic pulses from said radar control system to form later output-pulses, oscillator means connected to receive said output-pulses and only generate oscillatory electrical energy in response thereto, at least two radiating means commonly connected to receive and radiate as an output-signal said electrical energy from said oscillator means, and modulator means connected to periodically attenuate said output-signal from said radiating means and to vary the power division therebetween for providing apparent angular displacements of the simulated target with respect to said radar control system, whereby there is obtained by transmission of said electrical energy from said radiating means an apparent radar target at a range proportional to said delay which traverses a predetermined angular sector at controlled values of speed.

8. A target simulator for a radar control system which radiates periodic pulses of energy followed by listening periods and effects a mechanical movement in accordance with information returned therein, said simulator comprising, delay means connected to said radar control system to receive and delay said periodic pulses from said radar control system to form later output-pulses, oscillator means connected to receive said output-pulses and only generate oscillatory electrical energy in response thereto, at least two radiating means commonly connected to receive and radiate as an output-signal said electrical energy from said oscillator means, and modulator means connected to periodically attenuate said electrical energy traveling between said oscillator means and said radiating means, whereby there is obtained by transmission of said electrical energy from said radiating means an apparent radar target at a range proportional to said delay with controlled values of signal strength.

References Cited in the file of this patent

UNITED STATES PATENTS

| | | |
|---|---|---|
| 2,440,253 | Dodington | Apr. 27, 1948 |
| 2,549,385 | Rapuano | Apr. 17, 1951 |
| 2,570,500 | Smith | Oct. 9, 1951 |
| 2,706,773 | Dodington | Apr. 19, 1955 |
| 2,763,778 | Gleason | Sept. 18, 1956 |
| 2,765,460 | Marion | Oct. 2, 1956 |
| 2,781,511 | Pear | Feb. 12, 1957 |
| 2,942,257 | Huntington | June 21, 1960 |
| 2,952,848 | Zahalka et al. | Sept. 13, 1960 |